United States Patent [19]

Guggenheim et al.

[11] Patent Number: 4,757,150

[45] Date of Patent: * Jul. 12, 1988

[54] POLYETHERIMIDE BISPHENOL COMPOSITIONS

[75] Inventors: Thomas L. Guggenheim, Scotia; Joseph W. Guiles, Cohoes; John W. Verbicky, Jr., Scotia, all of N.Y.

[73] Assignee: General Electric Company, Schenectady, N.Y.

[*] Notice: The portion of the term of this patent subsequent to Sep. 9, 2003 has been disclaimed.

[21] Appl. No.: 891,014

[22] Filed: Jul. 31, 1986

[51] Int. Cl.$^4$ .............................................. C07D 209/48
[52] U.S. Cl. ..................................... 548/461; 528/185
[58] Field of Search ......................................... 548/461

[56] References Cited

U.S. PATENT DOCUMENTS

| | | | |
|---|---|---|---|
| 3,734,926 | 5/1973 | Dexter | 548/461 |
| 3,746,721 | 7/1973 | Stephen | 548/461 |
| 4,054,600 | 10/1977 | Johnson | 548/461 |
| 4,403,056 | 9/1983 | Giolito et al. | 558/270 |
| 4,611,048 | 9/1986 | Peters | 528/185 |

FOREIGN PATENT DOCUMENTS 322342 2/1972 U.S.S.R. ................ 548/461

*Primary Examiner*—Mary E. Ceperley
*Attorney, Agent, or Firm*—William H. Pittman; James C. Davis, Jr.; James Magee, Jr.

[57] ABSTRACT

Polyetherimide bisphenols and bischloroformates are prepared by the reaction of dianhydrides or certain bisimides with aminophenols or mixtures thereof with diamines. They are useful as intermediates for the preparation of cyclic heterocarbonates, which may in turn be converted to linear copolycarbonates. The bisphenols can also be converted to salts which react with cyclic polycarbonate oligomers to form block copolyetherimidecarbonates.

4 Claims, No Drawings

POLYETHERIMIDE BISPHENOL COMPOSITIONS

This invention relates to bisphenol compositions useful in the preparation of cyclic heterocarbonates and block polyetherimide-polycarbonates.

Cyclic heterocarbonates, disclosed and claimed in copending, commonly owned application Ser. No. 890,053, filed July 28,1986, now U.S. Pat. No. 4,696,998 are valuable intermediates for the preparation of copolycarbonates. Such preparation may be achieved during extrusion or molding operations, or the copolycarbonates can be combined with fillers to form prepregs convertible to thermoplastic composites. Block polyimide-polycarbonates are also useful copolycarbonates. The present invention provides novel nitrogen-containing bisphenols and bischloroformates useful as intermediates for the preparation of cyclic heterocarbonates and block polyimide-polycarbonates.

In its broadest sense, the invention includes compositions comprising polyetherimide bisphenolic compounds of the formula

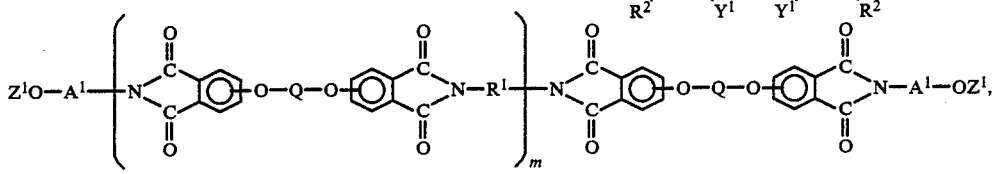

wherein:

$Z^1$ is hydrogen or

$A^1$ is a divalent aromatic radical;

$Q$ is a divalent aromatic hydrocarbon or substituted hydrocarbon radical;

$R^1$ is a divalent aromatic hydrocarbon radical containing about 6–20 carbon atoms or a halogenated derivative thereof, an alkylene or cycloalkylene radical containing about 2–20 carbon atoms, or a bis-alkylene-poly(dialkylsiloxane) radical;

$X$ is chlorine or bromine; and $m$ is from 0 to about 100.

As will be apparent from formula I, the compositions of this invention include bisphenols and bishaloformates derived therefrom. The preferred bishaloformates are the bischloroformates, wherein X is chlorine.

In formula I, the $A^1$ values may be such radicals as unsubstituted phenylene, substituted derivatives thereof, biphenylene, naphthylene, bis(4-phenylene)alkane, bis(4-phenylene) sulfide, bis(4-phenylene) sulfone and the like. Illustrative substituents (one or more) are alkyl, halo (especially chloro and/or bromo), nitro, alkoxy and the like. Phenylene radicals, especially unsubstituted phenylene, are preferred. Most often, $A^1$ is m- or p-phenylene.

The Q value may be attached through oxygen to the aromatic rings in formula I in the 3- or 4- positions, preferably the 4-positions, with respect to the free valence bonds. Illustrative Q radicals are derived from such compounds as resorcinal, hydroquinone, 4,4'-dihydroxybiphenyl, 4,4'dihydroxy-3,3',5,5'-tetramethylbiphenyl, 4,4'-dihydroxydiphenylmethane, 3,4'-dihydroxydiphenylmethane, 2,2-bis(2-hydroxyphenyl)propane, 2,2-bis(4-hydroxyphenyl)propane ("bishpenol A"), 2-(3-hydroxyphenyl)-2-(4-hydroxyphenyl)propane, 1,1-bis(4-hydroxyphenyl)ethane, 2,2-bis(4-hydroxyphenyl)pentane, 4,4'-dihydroxybenzophenone, bix(4-hydroxyphenyl) ether, bis(4-hydroxyphenyl) sulfide, bis(4-hydroxyphenyl) sulfoxide, bis(4-hydroxyphenyl) sulfone and 3-hydroxyphenyl-4-hydroxyphenyl sulfone.

The most preferred Q values are those having the formulas

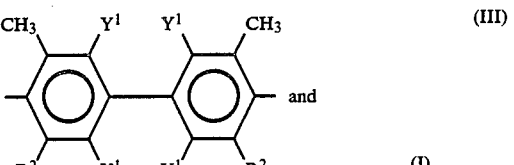

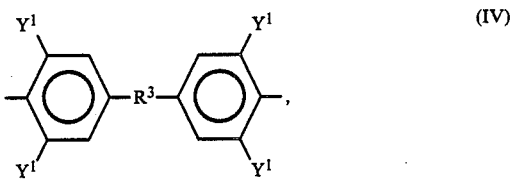

wherein each $R^2$ is independently hydrogen or methyl, $R^3$ is a straight chain or branched alkylene radical containing 1–5 carbon atoms and is most often the isopropylidene radical, and each $Y^1$ is independently hydrogen or halogen (usually chlorine or bromine). Especially desirable is the radical derived from bisphenol A by the removal of both hydroxy groups therefrom, and having formula IV wherein $R^3$ is isopropylidene and each $Y^1$ is hydrogen.

The $R^1$ value is as previously defined and may be considered as being derived from a diamine of the formula $R^1(NH_2)_2$. Examples of suitable $R^1$ values are those in such diamines as ethylenediamine, propylenediamine, trimethylenediamine, diethylenetriamine, triethylenetetramine, heptamethylenediamine, octamethylenediamine, 2,11-dodecanediamine, 1,12-octadecanediamine, 3-methylheptamethylenediamine, 4,4-dimethylheptamethylenediamine, 4-methylnonamethylenediamine, 2,5-dimethylhexamethylenediamine, 2,2-dimethylpropylenediamine, N-methyl-bis(3-aminopropyl)amine, 3-methoxyhexamethylenediamine, 1,2-bis(3-aminopropoxy)ethane, bis(3aminopropyl)sulfide, 1,4-cyclohexanediamine, bis-(4-aminocyclohexyl)methane, m-phenylenediamine, p-phenylenediamine, 2,4- diaminotoluene, 2,6-diaminotoluene, m-xylylenediamine, p-xylylenediamine, benzidine, 3,3'-dimethylbenzidine, 3,3'-dimethoxybenzidine, 1,5-diaminonaphthalene, bis(4-aminophenyl)methane, bis(4-aminophenyl)propane, 2,4-bis(β-amino-t-butyl)toluene, bis(p-β-methylo-aminopentyl)benzene, 1,3-diamino-4-isopropylbenzene, bis(4-aminophenyl) sulfone, bis(4-aminophenyl) ether and 1,3-bis(3-aminopropyl)tetramethyldisiloxane. Mixtures of these $R^1$ values may also be present. Preferably, $R^1$ is an aromatic hydrocarbon radical; the m-phenylene and bis(4-phenylene)methane radicals are particularly preferred.

The compositions of this invention include bisimides, in which m is 0, and higher polymides, in which m is 1 or greater (usually up to about 25). They may be prepared by art-recognized methods for the preparation of such compounds. These include the reactions of dianhydrides and certain bisimides with aminophenols or mixtures thereof with diamines. Such methods involving dianhydrides are disclosed in a large number of United States patents and other literature references. Methods involving certain bisimides are disclosed, for examle, in U.S. Pat. No. 4,578,470, the disclosure of which is incorporated by reference herein.

The dianhydrides and bisimides may be represented by the formula

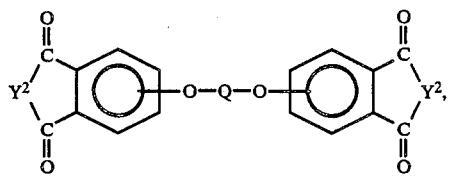

wherein $Y^2$ is oxygen or N—$Z^2$ and $Z^2$ is a highly electrondeficient group. Similarly, the aminophenols may be represented by the formula HO—$A^1$—$NH_2$.

The reaction leading to the polyetherimide bisphenols of this invention, involving the above-described dianhydrides or bisimides, aminophenols and (optionally) diamines, may be conducted under conventional conditions, using appropriate mole ratios of reagents and conventional reacton media. The bisphenols thus prepared may be converted to bishaloformates by reaction with a compound of the formula $COX_2$, preferably phosgene, under similarly conventional conditions.

The preparation of the polyetherimide bisphenolic compositions of this invention is illustrated by the following examples.

EXAMPLE 1

A mixture of 100.37 grams (192.8 mmol.) of 2,2-bis[4-(3,4-dicarboxyphenoxy)phenyl]propane dianhydride, 42.08 grams (385.6 mmol.) of m-aminophenol and 500 ml. of glacial acetic acid was heated under reflux for 4 hours, after which the acetic acid was removed by vacuum stripping, yielding a white solid which was collected by filtration and washed with cold methanol. The product was shown by elemental analysis to be the desired bisphenol having the formula

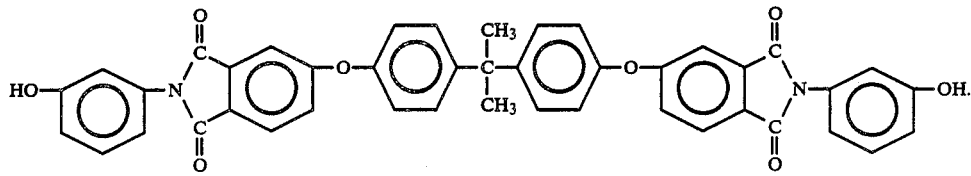

EXAMPLE 2

A solution in 200 ml of methylene chloride of 12.56 grams (17.9 mmol.) of the bisimide bisphenol of Example 1 was cooled to 0° C. and 5.3 grams (53.7 mmol.) of phosgene was metered in under the surface. A solution of 8 grams (53.68 mmol.) of diethylaniline in 20 ml. of methylene chloride was added over 15 minutes, with stirring and continued cooling. An exothermic reaction took place and the temperature rose to 8° C. Stirring was continued for 1 hour at 8° C. and for 1 hour at room temperature, after which the solution was sparged with nitrogen for 1 hour to remove excess phosgene. It was then diluted with 100 ml. of methylene chloride, washed three times with dilute aqueous hydrochloric acid and once with aqueous sodium chloride solution, dried over anhydrous magnesium sulfate, filtered and vacuum stripped to yield the bisimide bischloroformate as a glassy solid.

EXAMPLE 3

A solution of 261.22 grams (504 mmol.) of 2,2-bis[4-dicarboxyphenoxy)phenyl]propane dianhydride in 600 ml.. of o-dichlorobenzene was heated to 190° C. There was then added, with stirring, a mixture of 50.86 grams (471 mmol.) of m-phenylenediamine, 6.83 grams (63 mmol.) of p-aminophenol and 60 mg of sodium phenylphosphonate. Heating and stirring were continued at 190°-200° C. as water of reaction of removed by azeotropic distillation, and then for an additional 3 hours; the mixture was then cooled to room temperature. Methylene chloride, 400 ml., was added and the product was precipitated by pouring into methanol, filtered and dried in vacuum at 160° C. There was obtained the desired polyetherimide bisphenol having a weight average molecular weight, as determined by gel permeation chromatography, of about 17,800, corresponding to a polymer of the formula

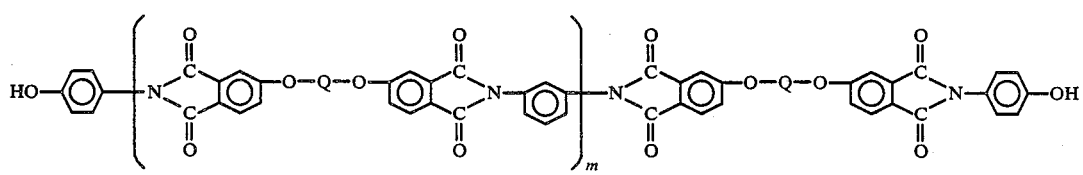

wherein Q is derived from bisphenol A and m is about 12.

As indicated hereinabove, the polyetherimide bisphenolic compounds of this invention are useful for the preparation of cyclic heterocarbonates, as disclosed and claimed in the aforementioned application Ser. No. 890,053, filed July 28, 1986. Particularly useful, now U.S. Pat. No. 4,696,998 in this regard are the bishaloformates. The bisphenols are of interest principally as intermediates for the preparation of said bishaloformates.

The cyclic heterocarbonates may be prepared by reacting
(A) a composition comprising at least one bishaloformate of this invention, or a mixture thereof with at least one bisphenol, with
(B) at least one oleophilic, aliphatic or heterocyclic tertiary amine, and
(C) an aqueous alkali or alkaline earth metal hydroxide or carbonate solution;
in (D) a substanially non-polar organic liquid which forms a two-phase system with water. The details of preparation are similar to those for preparing cyclic polycarbonate oligomers as described in European patent application No. 162,379 and in copending, commonly owned application Ser. No. 871,641, filed June 6, 1986, the disclosures of which are incorporated by reference herein.

Reagent A may be a mixture of bisphenols and bischloroformates, usually containing up to about 5 moles of bischloroformate per mole of bisphenol, or it may contain only bischloroformates. The latter situation is usually preferred.

The tertiary amines useful as reagent B ("tertiary" in this context denoting the absence of N—H bonds) generally comprise those which are oleophilic (i.e., which are soluble in and highly active in organic media, especially those used in the oligomer preparation method of this invention), and more particularly those which are useful for the formation of polycarbonates. Reference is made, for example, to the tertiary amines disclosed in U.S. Pat. Nos. 4,217,438 and 4,368,315, the disclosures of which are incorporated by reference herein. They include aliphatic amines such as triethylamine, tri-n-propylamine, diethyln-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and reagent A is essential for the formation of the cyclic heterocarbonate. For the most part, such amines contain at least about 6 and preferably about 6–14 carbon atoms.

The amines most useful as reagent B are trialkylamines containing no branching on the carbon atoms in the 1- and 2-positions. Especially preferred are tri-n-alkylamines in which the alkyl groups contain up to about 4 carbon atoms. Triethylamine is most preferred by reason of its particular availability, low cost, and effectiveness.

Reagent C is an aqueous alkali or alkaline earth metal hydroxide or carbonate solution, such as lithium, sodium, potassium or calcium hydroxide or sodium or potassium carbonate. It is most often lithium, sodium or potassium hydroxide, with sodium hydroxide being preferred because of its availability and relatively low cost. The concentration of said solution is not critical; it is generally about 0.1–16M, preferably about 0.2–10M and most desirably no higher than about 5M.

The fourth essential component (component D) in the cyclic heterocarbonate preparation method is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran. Methylene chloride is generally preferred.

To prepare the cyclic heterocarbonate, the reagents and components are maintained in contact under conditions whereby reagent A is present in low concentration. Actual high dilution conditions, requiring a large proportion of component D, may be employed but are usually not preferred for cost and convenience reasons. Instead, simulated high dilution conditions known to those skilled in the art may be employed. For example, in one embodiment of the method reagent A or reagents A and B are added gradually to a mixture of the other materials. It is within the scope of this embodiment to incorporate reagent B in the mixture to which reagent A is added, or to add it gradually, either in admixture with reagent A or separately. Continuous or incremental addition of reagent B is frequently preferred.

Although addition of reagent A neat (i.e., without solvents) is within the scope of this embodiment, it is often preferably added as a solution in a portion of component D. The proportion of organic liquid used for this purpose is not critical; about 25–75% by weight, and especially about 40–60%, is often preferred.

The reaction temperature is generally in the range of about 0°–50° C. It is most often about 0°–40° C. and preferably 20°–40° C.

For maximization of the yield and purity of cyclic heterocarbonates, it is preferred to use up to about 0.7 mole and preferably about 0.1–0.6 mole of reagent A per liter of component D in the reaction system, including any liquid used to dissolve reagent A. (It should be noted that this is not a molar concentration in component D when reagent A is added gradually, since said reagent is consumed as it is added to the reaction system.) The preferred molar ratio of reagent B to reagent A is about 0.5–1.5:1 and most often about 0.1–1.0:1. The molar ratio is reagent C to reagent A is usually about 1–5:1 and preferably about 1–3:1.

A highly preferred embodiment of the method for preparing the cyclic heterocarbonates comprises gradually adding reagent A and at least a portion of reagents B and C simultaneously to a substantially non-polar organic liquid (component D) or to a mixture of said liquid with water. A factor of some importance in this embodiment is the concentration of available reagent B, which should be maintained at a level as constant as possible during the entire addition period for reagent A. If all of reagent B is present in the reaction vessel into which reagent A is introduced, its concentration steadily decreases, principally by dilution. On the other hand, if reagent B is introduced continuously or in equal increments during introduction of reagent A, its available concentration is initially low and increases more or less steadily during the addition period. These fluctuations can result in a high and constantly varying proportion of high polymer (i.e., linear or cyclic polymer with a weight average molecular weight higher than about 30,000) in the product.

polymer; the structure of the cyclic product was shown by field desorption mass spectrometry to correspond generally to the formula

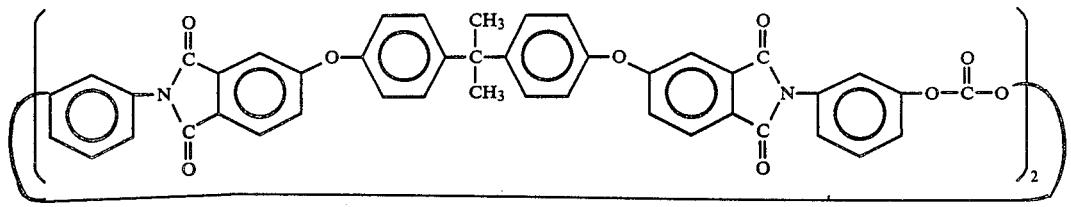

It has been found advantageous to introduce reagent B in one initial large portion, usually about 40–95% and preferably about 40–75% by weight of the total amount, followed by incremental or continuous addition of the balance thereof. By this procedure, the concentration of available reagent B is maintained at a fairly constant level in the organic phase during the entire addition period, and it is possible to minimize the proportion of high polymer is the product.

Under these conditions, it is usually advantageous for the reaction vessel to initially contain about 5–40% and preferably about 5–30% of total reagent C. The balance thereof is also introduced continuously or incrementally.

In generally, cyclic heterocarbonates prepared under these conditions contain very low proportions of linear oligomers. In many instances no more than about 5% by weight, and frequently no detectable amount, of such linear oligomers are present. Many products of this invention also contain low percentages (frequently less than 20% and preferably no higher than about 10%) of polymers (linear or cyclic) having a weight average molecular weight greater than about 30,000. Such polymers are frequently identified hereinafter as "high polymer".

When necessary, linears, high polymer and other impurities may be removed by conventional operations such as combining the solution with a non-solvent for said impurities. Illustrative non-solvents include ketones such as acetone and methyl isobutyl ketone and esters such as methyl acetate and ethyl acetate. Acetone is a particularly preferred non-solvent.

The preparation of cyclic heterocarbonates from the bisimide bisphenolic compounds of this invention is illustrated by the following examples.

EXAMPLE 4

A mixture of 15 ml. of methylene chloride, 0.1 gram of triethylamine, 0.3 ml. of 5M aqueous sodium hydroxide solution and 1 ml. of water was heated at 40° C., with stirring. There were separately added over ½ hour a solution of 5 grams of the bisimide bischloroformate of Example 2 in 5 ml. of methylene chloride, 2.7 ml. of 5M aqueous sodium hydroxide solution and a solution of 52 mg. of triethylamine in 2 ml. of methylene chloride. When the addition was completed, the mixture was cloudy. Refluxing was continued for 10 minutes, after which the mixture was diluted with 100 ml. of chloroform and 50 ml. of methylene chloride. The cloudy organic layer was washed twice with dilute aqueous hydrochloric acid and once with aqueous sodium chloride solution, dried over magnesium sulfate and filtered. The filtrate was vacuum stripped to yield a tan glassy solid. It was shown by high pressure liquid-liquid chromatography to comprise 65% cyclics and 35% high polymer.

The cyclic heterocarbonates are in turn useful as intermediates for conversion to linear copolycarbonates. The method of preparation of such copolycarbonates comprises contacting at least one of the previously defined cyclic heterocarbonates with a polycarbonate formation catalyst at a temperature up to about 350° C.

The polycarbonate formation catalysts which can be used incude various bases and Lewis acids. It is known that basic catalysts may be used to prepare polycarbonates by the interfacial method, as well as by transesterification and from cyclic oligomers. Reference is made to the aforementioned U.S. Pat. Nos. 3,155,683, 3,274,214, 4,217,438 and 4,368,315. Such catalysts may also be used to polymerize the cyclic oligomer mixtures. Examples thereof are lithium 2,2,2-trifluoroethoxide, n-butyllithium and tetramethylammonium hydroxide. Also useful are various weakly basic salts such as sodium benzoate and lithium stearate.

A particularly useful class of Lewis bases is disclosed in copending, commonly owned application Ser. No. 723,672, filed Apr. 16, 1985, now U.S. Pat. No. 4,605,731. It includes numerous tetraarylborate salts, including lithium tetraphenylborate, sodium tetraphenylborate, sodium bis(2,2'-biphenylene)borate, potassium tetraphenylborate, tetramethylammonium tetraphenylborate, tetra-n-butylammonium tetraphenylborate, tetramethylphosphonium tetraphenylborate, tetra-n-butylphosphonium tetraphenylborate and tetraphenylphosphonium tetraphenylborate. The preferred catalysts within this class are the tetra-n-alkylammonium and tetra-n-alkylphosphonium tetraphenylborates. Tetramethylammonium tetraphenylborate is particularly preferred because of its high activity, relatively low cost and ease of preparation from tetramethylammonium hydroxide and an alkali metal tetraphenylborate.

Lewis acids useful as polycarbonate formation catalysts include dioctyltin oxide, triethanolaminetitanium isopropoxide, tetra(2-ethylhexyl) titanate and polyvalent metal (especially titanium and aluminum) chelates such as bisisopropoxytitanium bisacetylacetonate (commercially available under the tradename "Tyzor AA") and the bisisopropoxyaluminum salt of ethyl acetoacetates. Among the preferred catalysts are lithium stearate and bisisopropoxytitanium bisacetylacetonate.

The copolycarbonate formation reaction is typically effected by merely contacting the cyclic heterocarbonate with the catalyst at temperatures up to 350° C., preferably about 200°–300° C., until polymerization has proceeded to the extent desired. Although the use of a solvent is within the scope of the invention, it is generally not preferred. In general, the amount of catalyst used is about 0.001–1.0 mole percent based on carbonate structural units in the heterocarbonate.

The conditions of the polymerization reaction may be varied to produce resinous compositions of various molecular weights and molecular weight distributions (i.e., Mw/Mn ratios). Molecular weight can be controlled by varying the amount of catalyst, with a decrease in said amount generally resulting in an increase in molecular weight, or by employing known chain transfer or endcapping agents, of which diphenyl carbonate is an example, typically in amounts up to about 2.5 mole percent based on carbonate structural units in the heterocarbonate.

Among the processing operations which can be conducted simultaneously with polymerization are various extrusion and molding operations. Thus, the cyclic heterocarbonates may be combined with polycarbonate formation catalysts of the type described hereinabove and fed to an extruder which is maintained at polymerization temperature. The effluent from the extruder is then a polycarbonate in the desired sheet, rod or other form. The molecular weight of the product may be adjusted over a wide range by method previously described.

Similarly, the cyclic heterocarbonates may be combined with polycarbonate formation catalysts and injection molded at polymerization temperatures. Said heterocarbonates also have flow properties adequate for rotational molding simultaneous with polymerization. These capabilities make it possible to employ the cyclic heterocarbonates of this invention in operations previously unavailable with respect to copolycarbonates.

The cyclic heterocarbonates are also advantageously combined with inert filler materials to produce prepreg compositions which may be polymerized to thermoplastic composites having excellent impact resistance, moisture resistance and ductility. The composites have a number of advantages over the somewhat more well known thermoset composites, such as the capability of being shaped after polymerization is completed.

The preparation of copolycarbonates from the cyclic heterocarbonates is illustrated by the following examples. All molecular weights are weight average and were determined by gel permeation chromatography relative to polystyrene.

EXAMPLE 5

High polymer was removed from the product of Example 4 by precipitation with acetone. A 1-gram sample of the resulting cyclic product was combined with 0.77 mg. of tetra-n-butylammonium tetraphenylborate and 20 ml. of methylene chloride. The resulting solution was vacuum stripped and the residue was dried for 4 hours in a vacuum oven at 80° C. It was heated for 15 minutes under nitrogen at 305° C., yielding a yellow polymer having a molecular weight of 35,500.

The polyetherimide bisphenols of this invention are also useful as intermediates for the preparation of copolyimidecarbonates, as disclosed and claimed in copending, commonly owned application Ser. No. 899,374, filed Aug. 22, 1986, now abandoned. For this purpose, they are converted to salts, typically alkali metal salts, which are in turn reacted with cyclic polycarbonate oligomers. Such oligomers typically contain structural units of the formula

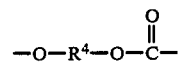

wherein at least about 60% of the total number of $R^4$ values are divalent aromatic organic radicals, the balance thereof being aliphatic, alicyclic or aromatic organic radicals.

Preferably, at least about 80% of the total number of $R^4$ values, and most desirably all of said $R^4$ values, are aromatic. The aromatic $R^4$ radicals preferably have the formula $$-A^2-Y^3-A^3-, \qquad (VI)$$

wherein each of $A^2$ and $A^3$ is a monocyclic divalent aromatic radical and $Y^3$ is a bridging radical in which one or two atoms separate $A^2$ from $A^3$. The free valence bonds in formula VI are usually in the metal or para positions of $A^2$ and $A^3$ in relation to $Y^3$.

In formula VI, the $A^2$ and $A^3$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^2$ and $A^3$ are preferably p-phenylene, although both may be o- or m-phenylene or one o- or m-phenylene and the other p-phenylene.

The bridging radical, $Y^3$, is one in which one or two atoms, preferably one, separate $A^2$ from $A^3$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-aklylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone.

The $R^4$ values may be considered as being derived from dihydroxy compounds of the formula HO—$R^4$—OH, especially dihydroxyaromatic compounds and preferably bisphenols of the formula HO—$A^2$—$Y^3$—$A^3$—OH. The following dihydroxy compounds are illustrative:
Ethylene glycol
Propylene glycol
1,3-Propanediol
1,4-Butanediol
1,6-Hexanediol
1,12-Dodecanediol
2-Ethyl-1,10-decanediol
2-Butene-1,4-diol
1,3-Cyclopentanedoil
1,3-Cyclohexanediol
1,4-Cyclohexanediol
1,4-Bis(hydroxymethyl)benzene (which is a vinylog of ethylene glycol and has similar properties)
Resorcinol
4-Bromoresorcinol
Hydroquinone
4,4′-Dihydroxybiphenyl
1,6-Dihydroxynaphthalene
2,6-Dihydroxynaphthalene
Bis(4-hydroxyphenyl)methane
Bis(4-hydroxyphenyl)diphenylmethane Bis(4-hydroxyphenyl)-1-naphthylmethane
1,1-Bis(4-hydroxyphenyl)ethane
1,2-Bis(4-hydroxyphenyl)ethane
1,1-Bis(4-hydroxyphenyl)-1-phenylethane
2,2-Bis(4-hydroxyphenyl)propane ("bisphenol A")
2-(4-Hydroxyphenyl)-2-(3-hydroxyphenyl) propane
2,2-Bis(4-hydroxyphenyl)butane
1,1-Bis(4-hydroxyphenyl)isobutane
1,1-Bis(4-hydroxyphenyl)cyclohexane
1,1-Bis(4-hydroxyphenyl)cyclododecane
Trans-2,3-bis(4-hydroxyphenyl)-2-butene
2,2-Bis(4-hydroxyphenyl)adamantane
α,α'-Bis(4-hydroxyphenyl)toluene
Bis(4-hydroxyphenyl)acetonitrile
2,2-Bis(3-methyl-4-hydroxyphenyl)propane
2,2-Bis(3-ethyl-4-hydroxyphenyl)propane
2,2-Bis(3-n-propyl-4-hydroxyphenyl)propane
2,2-Bis(3-isopropyl-4-hydroxyphenyl)propane
2,2-Bis(3-sec-butyl-4-hydroxyphenyl)propane
2,2-Bis(3-t-butyl-4-hydroxyphenyl)propane
2,2-Bis(3-cyclohexyl-4-hydroxyphenyl)propane
2,2-Bis(3-allyl-4-hydroxyphenyl)propane
2,2-Bis(3-methoxy-4-hydroxyphenyl)propane
2,2-Bis(3,5-dimethyl-4-hydroxyphenyl)propane
2,2-Bis(2,3,5,6-tetramethyl-4-hydroxyphenyl)propane
2,2-Bis(3-5-dichloro-4-hydroxyphenyl)propane
2,2-Bis(3,5-dibromo-4-hydroxyphenyl)propane
2,2-Bis(2,6-dibromo-3,5-dimethyl-4-hydroxyphenyl)propane
α,α-Bis(4-hydroxyphenyl)toluene
α,α,α',α'-Tetramethyl-α,α'-bis(4-hydroxyphenyl)-p-xylene
2,2-Bis(4-hydroxyphenyl)hexafluoropropane
1,1-Dichloro-2,2-bis(4-hydroxyphenyl)ethylene
1,1-Dibromo-2,2-bis(4-hydroxyphenyl)ethylene
1,1-Dichloro-2,2-bis(5-phenoxy-4-hydroxyphenyl)ethylene
4,4'-Dihydroxybenzophenone
3,3-Bis(4-hydroxyphenyl)-2-butanone
1,6-Bis(4-hydroxyphenyl)-1,6-hexanedione
Bis(4-hydroxyphenyl) ether
Bis(4-hydroxyphenyl) sulfide
Bis(4-hydroxyphenyl) sulfoxide
Bis(4-hydroxyphenyl) sulfone
Bis(3,5-diemthyl-4-hydroxyphenyl) sulfone
9,9-Bis(4-hydroxyphenyl) fluorene
2,7-Dihydroxypyrene
6,6'-Dihydroxy-3,3,3',3'-tetramethylspiro(bis)indane ("spirobiindane bisphenol")
3,3-Bis(4-hydroxyphenyl)phtalide
2,6-Dihydroxydibenzo-p-dioxin
2,6-Dihydroxythianthrene
2,7-Dihydroxyphenoxathiin
2,7-Dihydroxy-9,10-dimethylphenazine
3,6-Dihydroxydibenzofuran
3,6-Dihydroxydibenzothiophene
2,7-Dihydroxycarbazole.

Bisphenol A is often preferred for reasons of availability and particular suitability for the purposes of the invention.

The cyclic polycarbonate oligomers include dimers, trimers and tetramers of the type disclosed in the following U.S. Pat. Nos.: 3,155,683, 3,274,214, 3,386,954, 3,422,119. Also included are cyclic polycarbonate oligomer mixtures of the type disclosed in European patent application No. 162,379 and in copending Pat. No. commonly owned application Ser. No. 871,641, now U.S. Pat. No. 4,727,134 filed June 6, 1986, the disclosures of which are incorporated by reference herein.

Such cyclic oligomer mixtures consist essentially of oligomers having degrees of polymerization from 2 to about 30 and preferably to about 20, with a major proportion being up to about 12 and a still larger proportion up to about 15. Since they are mixtures of oligomers having varying degrees of polymerization, these compositions have relatively low melting points as compared to single compounds such as the corresponding cyclic trimer. The cyclic oligomer mixtures are generally liquid at temperatures above 300° C. and most often at temperatures above 225° C.

The cyclic oligomer mixtures contain very low proportions of linear oligomers. In general, no more than about 10% by weight, and most often no more than about 5%, of such linear oligomers are present. The mixtures also usually contain low percentages (frequently less than 30% and preferably no higher than about 20%) of polymers (linear or cyclic) having a degree of polymerization greater than about 30. Such polymers are frequently identified hereinafter as "high polymer". These properties, coupled with the relatively low melting points and viscosities of the cyclic oligomer mixtures, contribute to their utility as resin precursors, especially for high molecular weight resins, as described hereinafter.

These mixtures may be prepared by a condensation reaction involving at least one bishaloformate having the formula $$R^4(OCOX)_2, \qquad \text{(UTI)}$$

wherein $R^4$ and X are as defined hereinabove. The condensation reaction typically takes place interfacially when a solution of said compound in a substantially non-polar organic liquid is contacted with a tertiary amine from a specific class and an aqueous alkali metal hydroxide solution. Also present may be other compounds, including oligomers of the formula $$X-\overset{O}{\underset{\|}{C}}-O-R^4-O-\overset{O}{\underset{\|}{C}}\left(-O-R^4-O-\overset{O}{\underset{\|}{C}}\right)_n -X,$$

wherein n is a small number, typically about 1–4.

While the X values in formula VII may be chlorine or bromine, the bischloroformates, in which X is chlorine, are most readily available and their use is therefore preferred. Frequent reference to bischloroformates will be made hereinafter, but it should be understood that other bishaloformates may be substituted therefor as appropriate.

The bischloroformate may be employed in substantially pure, isolated form. It is frequently preferred, however, to use a crude bischloroformate product. Suitable crude products may be prepared by any known methods for bischloroformate preparation. Typically, at least one bisphenol is reacted with phosgene in the presence of a substantially inert organic liquid.

In addition to the bisphenol bischloroformate, such crude bischloroformate products may contain oligomer bischloroformates. Most often, a major proportion of the crude product comprises monomer, dimer and trimer bischloroformates. Higher oligomer bischloroformates, and monochloroformates corresponding to any of the aforementioned bischloroformates, may also be present, preferably only in trace amounts.

The tertiary amines useful for cyclic oligomer preparation ("tertiary" in this context denoting the absence of N—H bonds) generally comprise those which are oleophilic (i.e., which are soluble in and highly active in organic media, especially those used in the oligomer preparation method of this invention), and more particularly those which are useful for the formation of polycarbonates. Reference is made, for example, to the tertiary amines disclosed in U.S. Pat. Nos. 4,217,438 and 4,368,315, the disclosures of which are incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and bischloroformate is essential for the formation of the cyclic oligomer mixture. For the most part, such amines contain at least about 6 and preferably about 6–14 carbon atoms.

The most useful amines are trialkylamines containing no branching on the carbon atoms in the 1- and 2-positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

Suitable aqueous alkali or alkaline earth metal hydroxide or carbonate solutions (hereinafter sometimes designated "metal base") include lithium, sodium, potassium or calcium hydroxide or sodium or potassium carbonate. Sodium hydroxide is preferred because of its availability and relatively low cost. The concentration of the solution is not critical and may be about 0.2–16M.

The fourth essential component in the cyclic oligomer preparation method is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran. Methylene chloride is generally preferred.

To prepare the cyclic oligomer, the reagents and components are maintained in contact under conditions whereby the bischloroformate is present in low concentration. Actual high dilution conditions, requiring a large proportion of organic liquid, may be employed but are usually not preferred for cost and convenience reasons. Instead, simulated high dilution conditions known to those skilled in the art may be employed. For example, in one embodiment of the method the bischloroformate, and optionally other reagents, are added gradually to a reaction vessel containing solvent.

The reaction temperature is generally in the range of about 0°–50° C. It is most often about 0°–40° C. and preferably 20°–40° C.

For maximization of the yield and purity of cyclic oligomers as opposed to high polymer and insoluble and/or intractable by-products, it is preferred to use not more than about 1.5 mole of bischloroformate per liter of organic liquid in the reaction system, including any liquid used to dissolve bischloroformate. Preferably, about 0.003–1.0 mole of bischloroformate is used.

The molar proportions of the reagents constitute another important feature for yield and purity maximization. The preferred molar ratio of amine to bischloroformate used alone (calculated as bisphenol bischloroformate) is about 0.1–1.0:1 and most often about 0.15–0.6:1, and that of metal base to bischloroformate is about 1.5–3:1 and most often about 2–3:1.

Separation of the oligomer mixture from at least a portion of the high polymer and insoluble material present is sometimes necessary or desirable. When other reagents are added to the metal base and the preferred conditions and material proportions are otherwise employed, the cyclic oligomer mixture (obtained as a solution in the organic liquid) typically contains less than 30% by weight and frequently less than about 20% of high polymer and insoluble material. When all of the preferred conditions described hereinafter are employed, the product may contain 10% or even less of such material. Depending on the intended use of the cyclic oligomer mixture, the separation step may then be unnecessary.

When such removal is necessary, it may be achieved by conventional operations such as combining the crude product, as a solid or in solution, with a non-solvent for said impurities. Illustrative non-solvents include ketones such as acetone and methyl isobutyl ketone and esters such as methyl acetate and ethyl acetate. Acetone is a particularly preferred non-solvent.

Recovery of the cyclic oligomers normally means merely separating the same from diluent (by known methods such as vacuum evaporation) and, optionally, from high polymer and other impurities. As previously suggested, the degree of sophistication of recovery will depend on such variables as the intended end use of the product.

The cyclic bisphenol A polycarbonate oligomer mixtures have been shown to contain oligomers having degrees of polymerization from 2 to 12, including substantially all of those from 2 to 6, with about 50–70% (by weight) thereof being in the range from 2 to 5. It is generally preferred to use said mixtures as prepared, or optionally with separation of high polymer and/or insolubles.

The preparation of cyclic oligomer mixtures is illustrated by the following examples. All parts and percentages in the examples herein are by weight unless otherwise indicated. Temperatures are in degrees Celsius. Molecular weights are weight average unless otherwise indicated and were determined by gel permeation chromatography relative to polystyrene.

EXAMPLES 6–23

Bisphenol A bischloroformate was reacted with aqueous sodium hydroxide and triethylamine in an organic liquid (chloroform in Example 12, methylene chloride in all other examples) according to the following procedure: The bischloroformate was dissolved in half the amount of organic liquid employed and was added gradually, with slow stirring, to the balance of the reaction mixture. In Examples 6–15 and 17, the triethylamine was all originally present in the reaction vessel; in Examples 19-21, it was added gradually at the same time as the bischloroformates; and in Examples 16, 18, 22 and 23, it was added in equal increments at the beginning of bischloroformate addition and at intervals of 20% during said addition. The amount of sodium hydroxide used was 2.4 moles per mole of bischloroformate. After all the bischloroformate had been added, the mixture was stirred for about 2 minutes and the reaction was quenched by the addition of a slight excess of 1M aqueous hydrochloric acid. The solution in the organic liquid was washed twice with dilute aqueous hydrochloric acid, dried by filtration through phase separation paper and evaporated under vacuum. The residue was dissolved in tetrahydrofuran and high polymer was precipitated by addition of acetone.

The reaction conditions for Examples 6-23 are listed in Table I together with the approximate percentage (by weight) of cyclic polycarbonate oligomer present in the product before high polymer precipitation. The weight average molecular weights of the cyclic oligomer mixtures were approximately 1300, corresponding to an average degree of polymerization of about 5.1.

minutes, with stirring, to a reaction vessel containing the balance of the methylene chloride. The total amount of bischloroformate was 400 mmol. per liter of methylene chloride. Triethylamine, 200 mmol., was added in equal increments at intervals of 25% during bischloroformate addition. The peak reaction temperature was 37°. Upon workup as in Examples 6-23, there was obtained a product comprising 82% cyclic polycarbonate oligomer.

EXAMPLE 26

The crude bischloroformate composition used was a bisphenol A bischloroformate composition corresponding roughly to the dimer.

A 300-ml. Morton Flask was charged with 128 ml. of methylene chloride, 10 ml. of water, 2 ml. of 4.9M aqueous sodium hydroxide, 1.16 ml. of triethylamine and 5 ml. of 0.66M aqueous disodium salt of bisphenol A. The mixture was heated under reflux with stirring, as 40 ml. of a 1.06M solution of the bischloroformate in methylene chloride was added over 37 minutes. There were concurrently added an additional 35 ml. of the bisphe-

TABLE 1

| Example | Bischloroformate amt., mmole/l. org. liquid | Bischloroformate amt., total mmol. | NaOH molarity | Molar ratio, amine: bischloroformate | Temperature | Addition time, min. | % oligomer in product |
| --- | --- | --- | --- | --- | --- | --- | --- |
| 6 | 100 | 2 | 0.313 | 0.5 | 20 | 30 | 97 |
| 7 | 100 | 2 | 0.625 | 0.5 | 20 | 30 | 95 |
| 8 | 100 | 2 | 2.5 | 0.5 | 35 | 55 | 93 |
| 9 | 100 | 2 | 2.5 | 0.5 | 0 | 30 | 77 |
| 10 | 100 | 2 | 2.5 | 0.5 | 20 | 30 | 87 |
| 11 | 100 | 2 | 2.5 | 0.5 | 35 | 30 | 78 |
| 12 | 100 | 2 | 2.5 | 0.5 | 50 | 30 | 88 |
| 13 | 100 | 2 | 2.5 | 0.25 | 20 | 30 | 74 |
| 14 | 100 | 1 | 2.5 | 0.2 | 20 | 15 | 75 |
| 15 | 200 | 4 | 2.5 | 0.5 | 20 | 30 | 88 |
| 16 | 500 | 10 | 2.5 | 0.25 | 25 | 105 | 83 |
| 17 | 500 | 10 | 2.5 | 0.25 | 25 | 105 | 78 |
| 18 | 500 | 10 | 2.5 | 0.25 | 25 | 105 | 83 |
| 19 | 500 | 10 | 2.5 | 0.25 | 25 | 105 | 87 |
| 20 | 500 | 10 | 2.5 | 0.29 | 30 | 90 | 78 |
| 21 | 500 | 10 | 2.5 | 0.25 | 30 | 20 | 75 |
| 22 | 500 | 10 | 2.5 | 0.25 | 40–45 | 105 | 79 |
| 23 | 500 | 10 | 2.5 | 0.4 | 25 | 105 | 79 |

EXAMPLE 24

Bisphenol A bischloroformate (2.0 mmol.) was reacted with aqueous sodium hydroxide and 4-dimethylaminopyridine in methylene chloride. The procedure employed was that of Example 6, except that 66.67 mmol. of bisphenol A per liter of methylene chloride was employed, the aqueous sodium hydroxide concentration was 5.0M and the reaction temperature was about 25° C. The product comprised 85% cyclic oligomer.

EXAMPLE 25

A crude bisphenol A bischloroformate product was analyzed as follows:
Monomer bischloroformate: 58%
Dimer bischloroformate: 26%
Trimer bischloroformate: 10%.
and had an average degree of polymerization of about 1.5. An amount thereof containing 800 mmol. of monomer and oligomer bischloroformates, calculated as monomer bischloroformate, dissolved in one-half the total amount of methylene chloride used, and 450 ml. of 5M aqueous sodium hydroxide were added over 37 nol A disodium salt solution over 32 minutes, 10 ml of sodium hydroxide solution over 30 minutes, and 0.36 ml. of triethylamine in 10 equal increments 3½ minutes apart. Stirring was continued for several minutes, after which the aqueous and organic phases were separated and the aqueous layer was washed with methylene chloride. The combined organic phases were washed once with dilute aqueous sodium hydroxide, twice with aqueous hydrochloric acid, once again with sodium hydroxide and twice with water, and dried over magnesium sulfate. Upon filtration, vacuum stripping and drying in an oven, there was obtained a white solid comprising the desired cyclic oligomer mixture, containing about 89% cyclic oligomers.

To prepare the block copolyetherimidecarbonates, the salt of the polyetherimide bisphenol of this invention is contacted with the cyclic polycarbonate oligomer composition in solution or in the melt at a temperature in the range of about 20°–300° C. The copolymers thus obtained have high solvent resistance and thermal stability, and are useful as engineering plastics in many applications.

The preparation of copolyetherimidecarbonates is illustrated by the following example.

EXAMPLE 27

Sodium hydride, 250 mg., was added to a solution in dry dimethylformamide of 2 grams of a polyetherimide bisphenol similar to that of Example 3 and having a weight average molecular weight of about 19,800. The mixture was stirred for 2 hours at room temperature and filtered in a dry box under nitrogen. There was then added 2 grams of a cyclic bisphenol A polycarbonate oligomer mixture similar to that of Example 26. Stirring was continued for ½ hour, after which the mixture was poured into methanol containing a small amount of sulfuric acid. The copolyetherimidecarbonate was separated by filtration and dried. It was found to have a weight average molecular weight of 43,200 and two galss transition temperatures, at 148° and 210° C.

The polyetherimide bisphenols of this invention may also be converted to copolyetherimideformals by reaction of salts thereof with methylene halides such as methylene chloride.

What is claimed is:

1. A polyetherimide bisphenolic compound of the formula

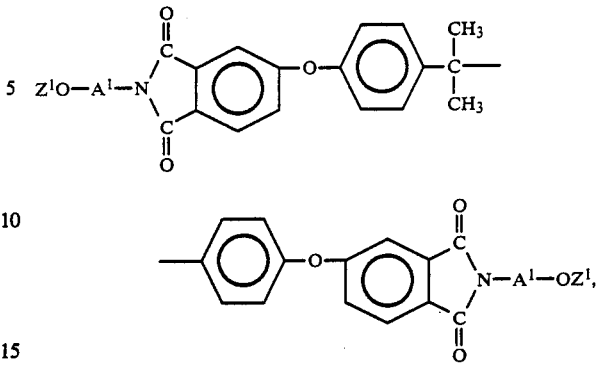

wherein:

$Z^1$ is hydrogen or

C—X;

$A^1$ is m- or p-phenylene; and
X is chlorine or bromine.

2. A compound according to claim 1 wherein $A^1$ is m-phenylene.
3. A compound according to claim 2 wherein $Z^1$ is hydrogen.
4. A compound according to claim 2 wherein $Z^1$ is

C—X and X is chlorine.

* * * * *

UNITED STATES PATENT AND TRADEMARK OFFICE
CERTIFICATE OF CORRECTION

PATENT NO. : 4,757,150

DATED : July 12, 1988

INVENTOR(S) : Thomas L. Guggenheim and Joseph W. Guiles

It is certified that error appears in the above-identified patent and that said Letters Patent is hereby corrected as shown below:

Title page, the name of John W. Verbicky, Jr., as a joint inventor should be deleted.

Signed and Sealed this

Twenty-second Day of November, 1988

Attest:

DONALD J. QUIGG

*Attesting Officer*  *Commissioner of Patents and Trademarks*